United States Patent [19]

Harman et al.

[11] Patent Number: 5,582,671

[45] Date of Patent: Dec. 10, 1996

[54] METHOD OF MANUFACTURING A FUSION SPLICING BLOCK FOR OPTICAL FIBER SPLICING

[75] Inventors: Murray R. Harman, Gloucester; James D. Marshall, Stittsville; Gordon A. Clark, Nepean, all of Canada

[73] Assignee: Fiberlign division of Preformed Line Products (Canada) Ltd., Napean, Canada

[21] Appl. No.: 480,072

[22] Filed: Jun. 7, 1995

Related U.S. Application Data

[60] Division of Ser. No. 289,200, Aug. 11, 1994, which is a continuation-in-part of Ser. No. 266,205, Jun. 27, 1994.

[51] Int. Cl.$^6$ ............................ G02B 6/255; C03B 37/15
[52] U.S. Cl. ............................ 156/257; 29/428; 29/527.5; 29/527.6; 65/407; 65/501; 156/158; 156/274.4; 156/380.3; 385/96
[58] Field of Search ............................ 385/96; 219/383; 65/501, 407; 156/257, 274.4, 273.9, 380.3, 158; 29/428, 527.5, 527.6

[56] References Cited

U.S. PATENT DOCUMENTS

| | | |
|---|---|---|
| 4,033,668 | 7/1977 | Presby . |
| 4,049,414 | 9/1977 | Smith . |
| 4,152,190 | 5/1979 | Kurosawa et al. ............ 65/501 X |
| 4,199,223 | 4/1980 | Yannoni ...................... 385/96 X |
| 4,220,394 | 9/1980 | Tardy . |
| 4,266,852 | 5/1981 | Higgins et al. . |
| 4,274,707 | 6/1981 | Pacey et al. . |
| 4,319,902 | 3/1982 | Hensel . |
| 4,326,870 | 4/1982 | Bendit et al. . |
| 4,350,867 | 9/1982 | Kinoshita et al. . |
| 4,372,768 | 2/1983 | Zucker et al. . |
| 4,416,506 | 11/1983 | Johnson et al. . |
| 4,423,923 | 1/1984 | Frazier et al. . |
| 4,433,896 | 2/1984 | Frazier . |
| 4,487,475 | 12/1984 | Ogawa . |
| 4,537,468 | 8/1985 | Degoix et al. . |
| 4,548,669 | 10/1985 | Steinmann et al. . |
| 4,557,557 | 12/1985 | Gleason et al. . |
| 4,561,719 | 12/1985 | Quan . |
| 4,598,974 | 7/1986 | Munn et al. . |
| 4,662,962 | 5/1987 | Malavielle . |
| 4,664,732 | 5/1987 | Campbell et al. . |
| 4,687,287 | 8/1987 | Lukas et al. . |
| 4,695,306 | 9/1987 | Hakoun et al. . |
| 4,727,237 | 2/1988 | Schantz . |
| 4,735,481 | 4/1988 | Lukas et al. . |
| 4,736,632 | 4/1988 | Case . |
| 4,758,061 | 7/1988 | Horn . |

(List continued on next page.)

FOREIGN PATENT DOCUMENTS 53-149655  5/1978  Japan .

OTHER PUBLICATIONS

Y. Kato et al., *Arc–fusion Splicing of Single Mode Fibers 2: A Practical Splice Machine*, Applied Optics, vol. 21, No. 11, Jun. 1, 1982, at 1916.

I. Hatakeyama et al., Fusion Splices for Single–Mode Optical Fibers, IEEE Journal of Quantum Electronics, vol. QE–14, No. 8, Aug. 1978, at 614.

*Primary Examiner*—Jeff H. Aftergut
*Attorney, Agent, or Firm*—Fay, Sharpe, Beall Fagan, Minnich & McKee

[57] ABSTRACT

A consumable fusion block for fusing optical fibers includes non-conducting substrate with at least one flat surface. A pair of electrodes overlay the flat surface of the substrate and are spaced apart on either side of a passline such that each electrode tip end is adjacent the passline. A space between the electrode tips defines an arc region which can be covered to form a semi-enclosed arc region. A method is also provided for manufacturing a plurality of fusion blocks from a single slab of non-conducting material by overlying the non-conducting material with a length of conducting material, bonding the conducting material to the non-conducting material, and cutting the slab into smaller fusion blocks.

2 Claims, 6 Drawing Sheets

U.S. PATENT DOCUMENTS

| | | |
|---|---|---|
| 4,790,617 | 12/1988 | Campbell et al. . |
| 4,810,054 | 3/1989 | Shinbori et al. . |
| 4,832,438 | 5/1989 | Engl et al. . |
| 4,877,303 | 10/1989 | Caldwell et al. . |
| 4,906,810 | 3/1990 | Sharma et al. .......................... 385/96 X |
| 4,911,524 | 3/1990 | Itoh et al. . |
| 4,920,366 | 4/1990 | Bowen et al. . |
| 4,947,693 | 8/1990 | Szuchy et al. . |
| 4,964,688 | 10/1990 | Caldwel et al. . |
| 4,964,689 | 10/1990 | Wichansky . |
| 4,969,705 | 11/1990 | Stoy et al. . |
| 5,002,351 | 3/1991 | Szanto et al. . |
| 5,011,259 | 4/1991 | Lieber et al. . |
| 5,095,519 | 3/1992 | Dorsey . |
| 5,134,470 | 7/1992 | Ravetti . |
| 5,146,527 | 9/1992 | Mallinson . |
| 5,218,184 | 6/1993 | Hakoun et al. . |
| 5,222,171 | 6/1993 | Straus ........................................ 385/96 |
| 5,249,247 | 5/1993 | Whitesmith . |

METHOD OF MANUFACTURING A FUSION SPLICING BLOCK FOR OPTICAL FIBER SPLICING

CROSS REFERENCE TO RELATED APPLICATIONS

This application is a divisional of application Ser. No. 08/289,200, filed Aug. 11, 1994 entitled FUSION SPLICING BLOCK WITH ELECTRODES DISPOSED ON A PLANAR SURFACE, which is a continuation-in-part of application Ser. No. 08/266,205, filed Jun. 27, 1994 entitled METHOD AND APPARATUS FOR CONTROLLING THE CONTACT OF OPTICAL FIBERS, the teachings of which are wholly incorporated herein by reference. This application is also related to application entitled TOOL FOR FUSING OPTICAL FIBERS, filed Aug. 11, 1994 in the name of the instant applicants, Ser. No. 08/289,291, now U.S. Pat. No. 5,481,640 the teachings of which are also wholly incorporated herein by reference.

FIELD OF THE INVENTION

This invention relates generally to a fusion element and more particularly to a consumable block for use in splicing optical fibers.

BACKGROUND OF THE INVENTION

Fusion splicing devices have been well known for some time and many of these devices are commercially available. One such device is described by the applicant in U.S. Pat. No. 5,002,351 issued Mar. 26, 1991 entitled Splicer for Optical Fibers. This and other similar devices are equipped with costly, permanent, tungsten electrodes capable of withstanding many repeated uses. The teachings of this patent and the following related art are incorporated herein by reference where applicable.

Another such device is described in U.S. Pat. No. 5,146,527 in the name of Mallinson issued Sep. 8, 1992. Mallinson's fusion splicer is designed to receive a consumable ferrule, having a bore through a central longitudinal axis, for accommodating two fiber ends for fusion within. A slot is formed in the ferrule into which permanent electrodes are temporarily inserted for fusing optical fibers positioned within the bore. Although the devices described in both of these patents appear to adequately perform their intended function, it is an object of this invention to provide a fusion block, having electrodes that are integral with the block and that are inexpensive and are designed to be used one or more times. Such a block should provide a clean fusion cavity in which fusion may take place. After fusion takes place, the block preferably remains with the spliced fused fibers.

U.S. Pat. No. 4,598,974 issued Jul. 8, 1986 in the name of Munn et al. describes an optical fiber connector having integral electrodes. Although Munn's device relates specifically to a connector having a pre-inserted optical fiber stub, it is possible to adapt this design to a fusion sleeve for fusing two unconnected optical fibers. However, it is believed that a limitation of Munn's connector is the cost related to assembling such sleeves that must be kept free of dust, debris and grease. In addition to these restrictions, it is difficult to mass produce such sleeves because each electrode must be individually inserted into its respective opening in the sleeve, adding to the cost of assembly.

2

Another more recently issued U.S. Pat. No. 5,222,171 issued Jun. 22, 1993 in the name of Straus, describes a sleeve similar to Munn's having integral electrodes and axial alignment means. In one embodiment shown in FIG. 10 of the Straus patent two pieces of metal are attached by an adhesive and act as electrodes on either side of tubular member. Each piece of metal has a hole and a transverse hole is formed in the tubular member. Application of electric current produces an arc from the edges of the holes, which fuse fiber ends therebetween. Although the Straus sleeve may work as described, placement of the electrodes in this manner, so that they are essentially parallel to one another on either side of the member, is not a preferred design and is costly to manufacture.

Therefore, it is also an object of the invention, to provide a consumable fusion block including electrodes that may be mass produced at a very lost cost.

It is also an object of the invention to provide a laminated fusion block having integral electrodes.

It is a further object of the invention to provide a fusion block having an electrode layer over or embedded in a non-conducting substrate.

STATEMENT OF THE INVENTION

In accordance with the invention there is provided a consumable fusion block for fusing optical fibers resting along a passline thereon comprising: a non-conducting substrate having a substantially flat surface; and, a pair of electrodes each electrode having a first electrode tip end and having a second other end for contacting a voltage source, a portion of the electrodes overlying the substantially flat surface of the non-conducting substrate and spaced apart on either side of the passline such that each electrode tip end is adjacent the passline, a space between the electrode tips defining an arc region.

In accordance with the invention, there is further provided, a consumable fusion block comprising of a non-conducting substrate, the substrate having two outer coated portions of conducting material for making contact with a voltage source and having two planar conducting electrodes overlaying a layer of the substrate, said conducting electrodes being electrically isolated from each other and each electrode being electrically connected to one of the outer coated portions.

Advantageously, providing a fusion block that has a flat non-conducting surface and overlaying an electrode layer, or alternatively a length of conducting electrode material, either by plating, printing, bonding, or casting, allows an array of fusion blocks to be manufactured simultaneously, at a low cost, later to be cut or parted into individual fusion blocks. The use of a planar technology, reduces the cost of producing each fusion block.

BRIEF DESCRIPTION OF THE DRAWINGS

Exemplary embodiments of this invention will be described in conjunction with the following drawings in which:

FIG. 5a is an oblique view of an alternative preferred embodiment of a fusion block assembly formed of two blocks of non-conducting substrate and having an electrode layer and plated barrels lining through holes that contact conducting contact pads;

FIG. 5b is a top view of the copper electrodes, plated barrel through holes, and copper pads shown in dotted outline of the fusion block assembly of FIG. 5a;

DETAILED DESCRIPTION OF THE DRAWINGS

Figure 1:
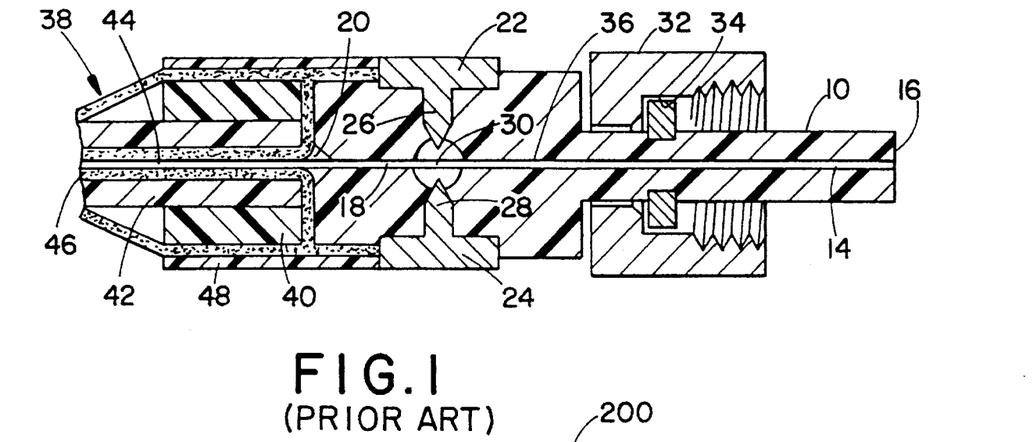
FIG. 1 is a cross sectional view of a prior art connector sleeve.

Referring to FIG. 1, a prior art connector as described in U.S. Pat. No. 4,598,974 is shown including an annular ferrule 10 that has an interior splice chamber 12, a first bore 14 leading from the splice chamber 12 to an exterior point or face 16 of the ferrule and a second exterior point 20 of the ferrule. The connector includes a pair of diametrically opposed metal electrodes 22 and 24 that are permanently mounted in the ferrule during factory fabrication. They include inwardly extending tips 26 and 28, respectively, which form an arc gap 30 within the splice chamber 12.

It has been found that inserting discrete components such as metal electrodes 22 and 24 is a costly effort and therefore not a preferred method of fabrication and assembly. These small components must be be handled individually and further, must be kept clean during the entire process. As well, the cylindrical shape of the ferrule does not lend itself to mass production of arc fusion blocks having electrodes inserted therein.

Figure 2A:
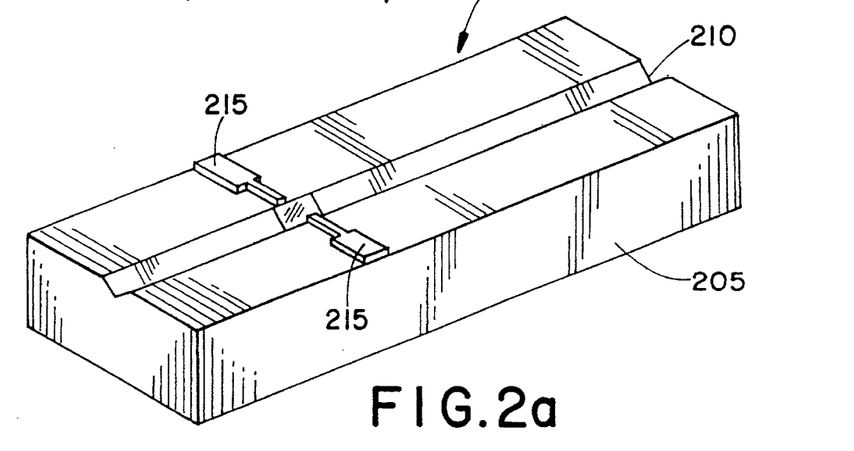
FIG. 2a is an oblique view of the preferred fusion block embodiment having electrodes overlying and being bonded to an alumina substrate.
Figure 2B:
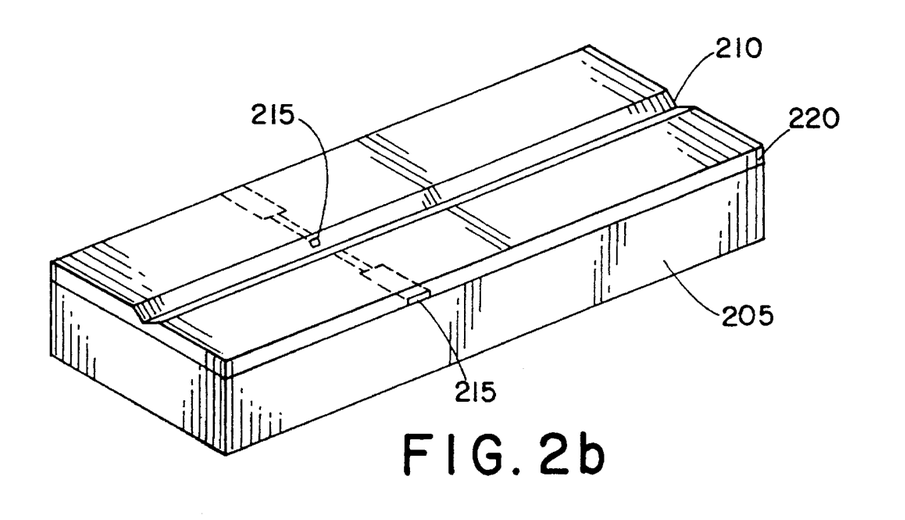
FIG. 2b is an oblique view of a fusion block including electrodes shown in dotted outline and having a layer of alumina over top of the electrodes.

Referring now to FIG. 2a, a fusion block 200 is shown comprising a non-conducting substrate of a material such as alumina. A pair of conducting electrodes 215 overlies and is preferably bonded to a flat surface of the substrate on either side of a pass line defined by a V-groove 210. The V-groove 210 serves as a guide for guiding and aligning two fibers to be fused into position. FIG. 2b is similar to that of 2a and includes a top layer of alumina 220 covering and sandwiching the electrodes. Experimental results have shown that a more controlled arc is obtained during fusion with a top layer 220.

Figures 3A, 3B, 4:
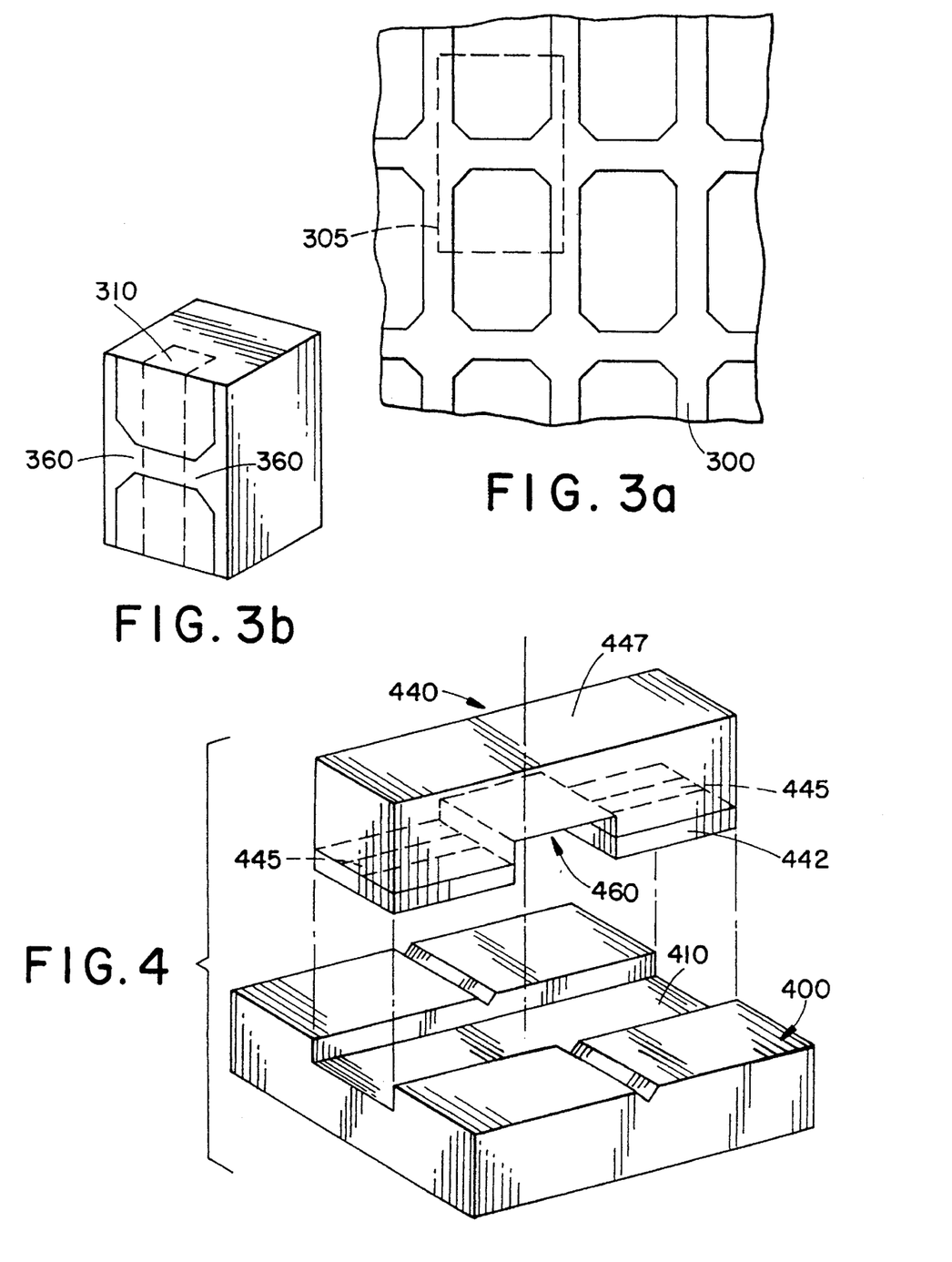
FIG. 3a is an elevational view of a sheet of patterned copper for use in mass production of an array of fusion blocks.
FIG. 3b is an oblique view of a fusion block including electrodes made from the patterned copper sheet of FIG. 3a overlaying a layer of non conducting ceramic material.
FIG. 4 is an oblique view shown partly in cross section and partly in dotted outline of a fusion block assembly.

By using a substrate 205 having a flat or nearly flat upper surface, strips or sheets of copper can be overlaid and bonded to one or more larger sheets of substrate material to provide an array of blocks, that can be separated into individual fusion blocks. By way of example, FIG. 3a is illustrative of a copper pattern formed from a sheet of copper 300. Similar copper patterns can be formed by chemical etching, or by die stamping. This patterned sheet 300 is bonded to a non-conducting substrate layer, and is later cut into individual fusion blocks. A dotted line 305 in FIG. 3a shows the outline of a pattern used for one fusion block shown in FIG. 3b. A trench or V-groove 310 defining a passline and a guide for the optical fibers to be fused, indicated by a dotted line in FIG. 3b, can be cut into the block to expose electrode tips 360.

Referring now to FIG. 4, an alternative fusion block is shown in two sections that during assembly are bonded together. A bottom section comprises a ceramic V-block 400 with a wide channel 410 cut through a central region for accommodating a multilayer top section 440 to be glued therein. The multilayer top section 440 is comprised of a bottom layer 442 of BeO or alumina that serves as a heat dissipation layer. A pair of electrodes 445 lie over the bottom layer and are initially deposited as a single copper strip. The copper strip is severed into the pair of electrodes 445 when the notch 460 is cut into the multilayer top section 440. After the top and bottom sections 400 and 440 are joined together, the notch 460 serves as an arc region across which a fusion arc is formed when a suitable voltage is applied across the electrodes 445. A top layer of Borosilicate glass 447 is bonded to the electrodes and to the bottom alumina layer. A transparent window may be provided for viewing the fibers to be fused together. The top layer 447 may also be a layer of alumina adjacent to the electrodes, for enhanced heat dissipation and a top layer of glass provided to retain transparency. By cutting a larger block of substrate material into an array of top sections 400 or bottom sections 440, they can be fabricated in large quantities at the same time.

Figures 5A, 5B:
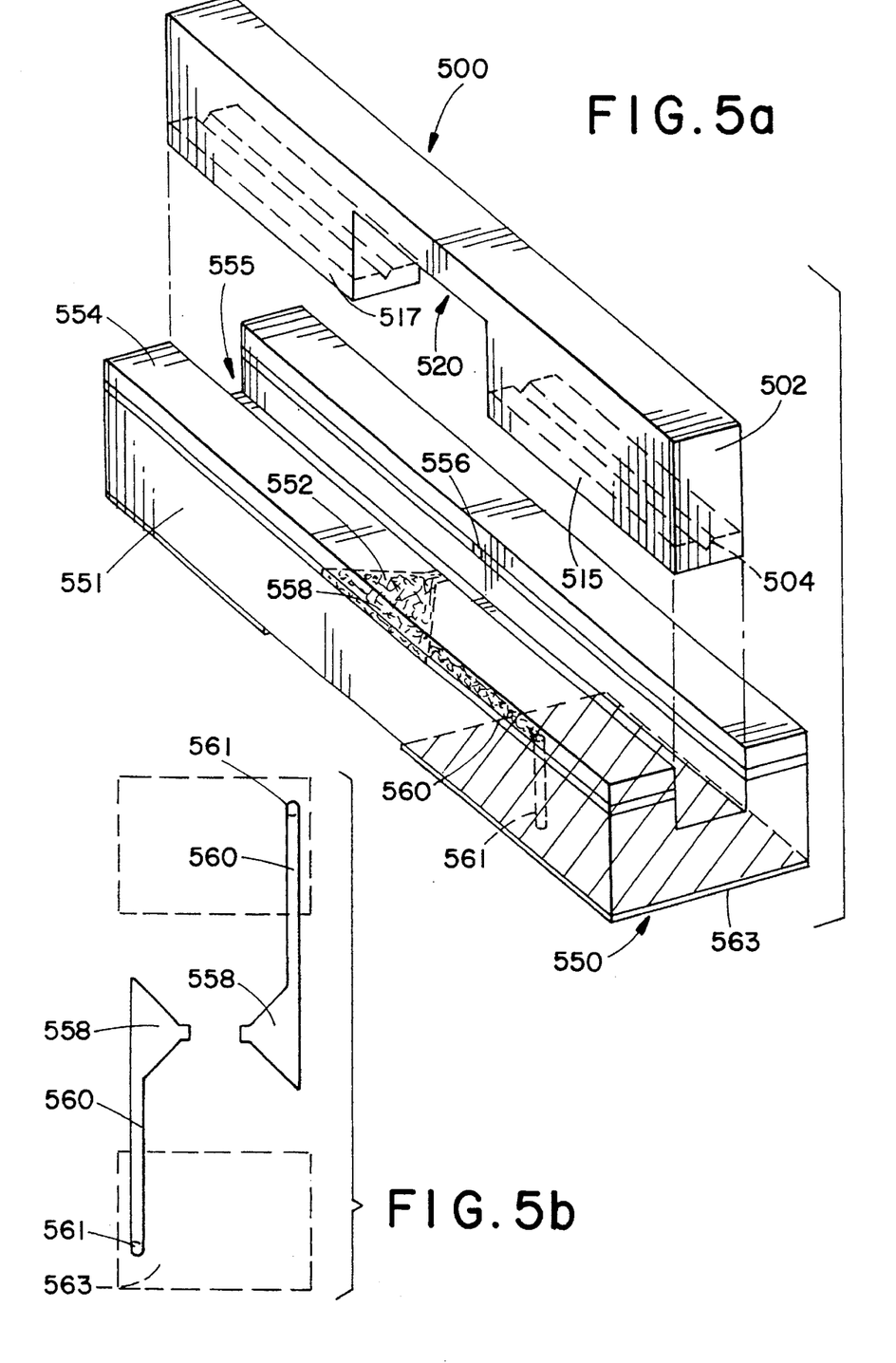

Referring now to FIGS. 5a and 5b, an alternate preferred embodiment is shown. For the purposes of illustration and of assembly, the fusion block is shown as an upper block 500 and a lower block 550 that are to be bonded together. Advantageously, this embodiment provides electrode contact pads 563 (one of which is shown) on an underside of the lower block 550 that have a large surface area for making electrical contact with a voltage source.

The lower base block 555, is comprised of a thick lower slab 551 of suitable non-conducting, heat dissipating material such as alumina. A planar copper layer 552 is bonded by way of being deposited or glued to the top of the lower base block 550. An upper layer of alumina 554 covers the copper layer 552 forming a copper sandwich between layers of alumina 551 and 554. An axial groove 555 is cut into the base block 550 through the copper layer 552 thereby forming two electrode tips 556 (one of which is shown). A portion of the electrode body 558 fans out and makes contact with a copper connecting track 560, however, an elongate electrode body could be used in place of the more triangular one shown. A copper plated barrel lining a through hole 561 forms an electrical path between the copper connecting track 560 and a copper contact layer that forms the contact pad 563 disposed at an end on the bottom of the base block 550.

The structure is symmetrical and the other electrode (not shown) makes electrical contact via a copper plated barrel lining a through hole with a contact pad disposed at the other end of the block.

The upper block 500 is comprised of a slab or block of alumina or like material, and is shown with a section cut out of a side of its mid-region. During fabrication of the fusion block, the upper block 500 is inserted and bonded into the axial groove of the lower block 550, the top portion 502 is ground off and a V-groove 504 is ground along the longitudinal axis of the upper block 500. The two portions 515 and 517 shown in dotted outline are all that remains after the top is ground off. The gap 520 between the two portions 515 and 517 forms an arc cavity.

Referring to FIG. 5b, a top view of the fusion block of FIG. 5a is shown. The copper on the back surface forming the contact pad 563 provides a large area for contacting with a suitable voltage supply or source. The plated through hole 561 adjacent each end provides a conducting path from the lower contact pad 563 layer though the substrate to the electrode layer.

Figure 5C:
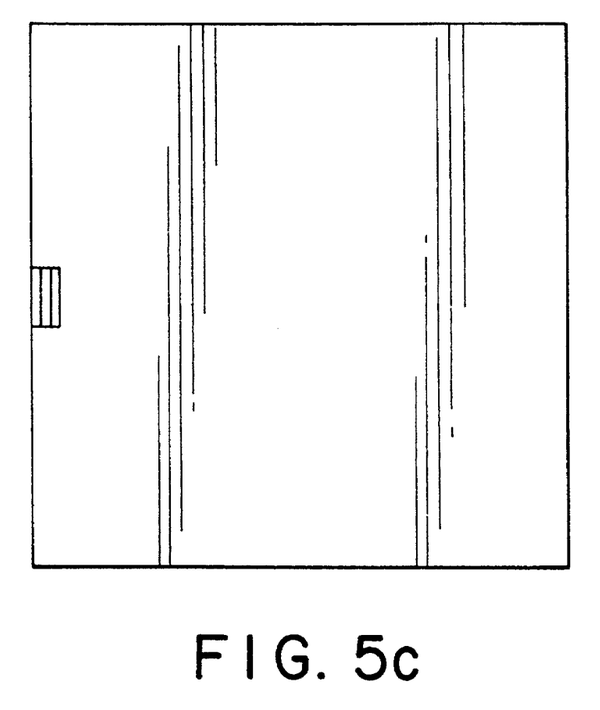
FIG. 5c is a top view of an array of fusion blocks prior to cutting them into individual blocks.

By using slabs of material that have substantially planar surfaces, arrays of blocks can be fabricated out of laminates of non-conducting substrate and conducting copper track material. Such an array is shown in FIG. 5c. From the four (4) inch by four (4) inch substrate shown, 12×31 fusion blocks can be fabricated by cutting the substrate accordingly, into rows and columns.

Figure 5D:
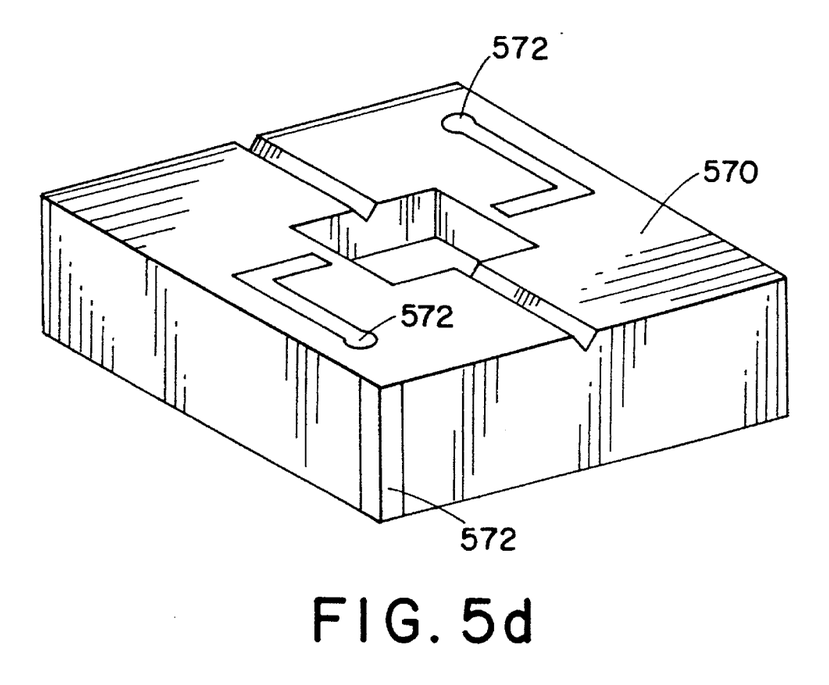
FIG. 5d is an oblique view of an alternative preferred embodiment of a fusion block assembly formed of a single block of non-conducting substrate having an electrode layer and plated barrels lining through holes that contact conducting contact pads.

FIG. 5d is a diagram of a block similar to the one shown in FIG. 5a, however, the block of FIG. 5d is absent a covering surface. The block 570 also resembles the one depicted in FIG. 2a but includes plated barrels lining through holes that make contact with large conducting contact pads on the bottom of the block (not shown).

Figure 6:
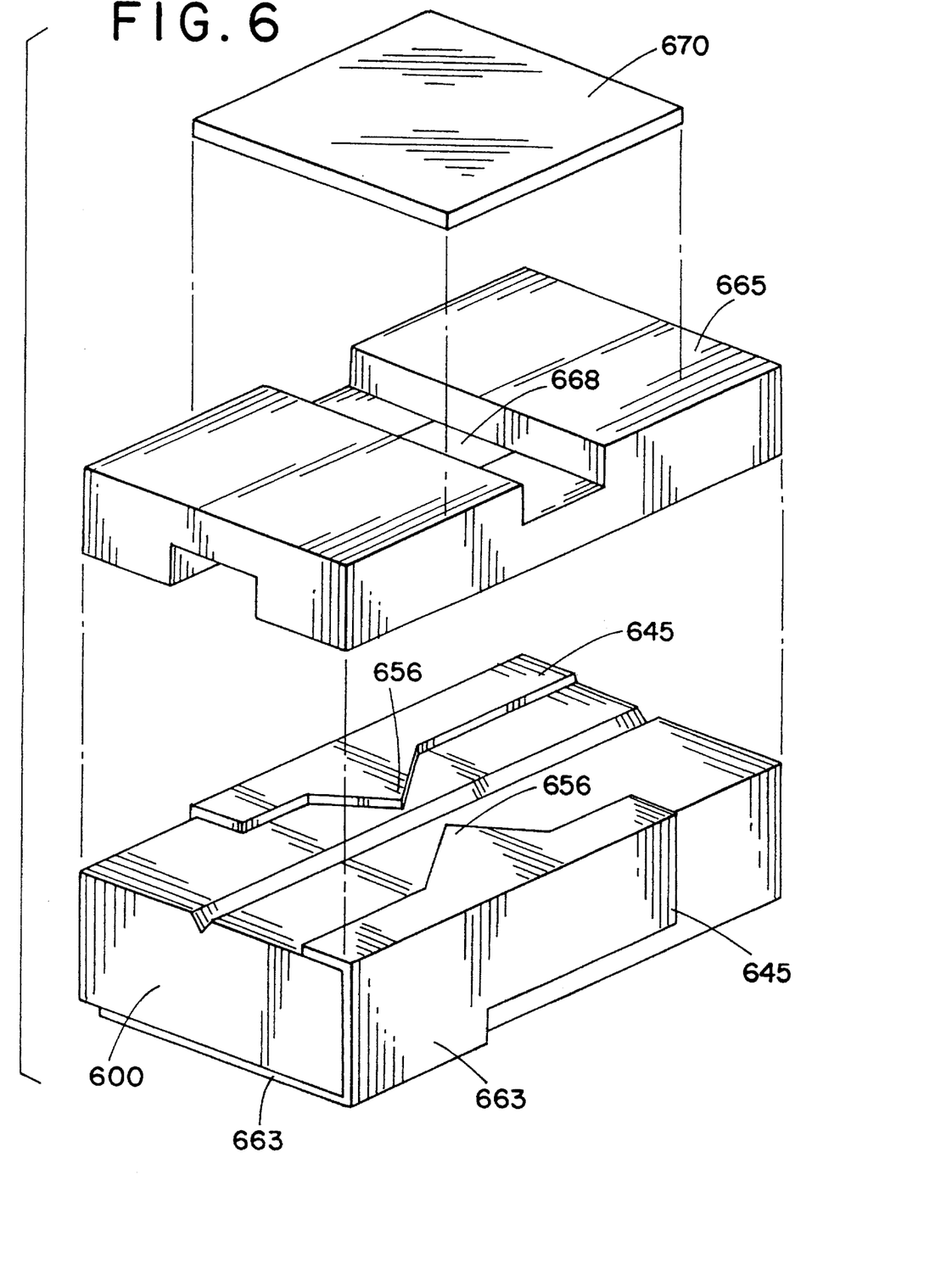
FIG. 6 is an oblique view of an alternative embodiment of a fusion block having electrodes formed over a non-conducting substrate.

Referring now, to FIG. 6, an alternate embodiment is illustrated, comprised of a slab or block of alumina 600, similar to the block 200 shown in FIG. 2a. Electrodes 645 are cut out of a sheet of copper and formed over the block. The electrodes each include a tip 656, a side portion and a contact surface 663 for contacting a voltage source. A ceramic top 665 is provided having a cavity slot and a viewing port 668. The opening defined between the electrode tips 656 can be covered by a glass cover 670 that fits over the ceramic top 665.

Figure 7A:
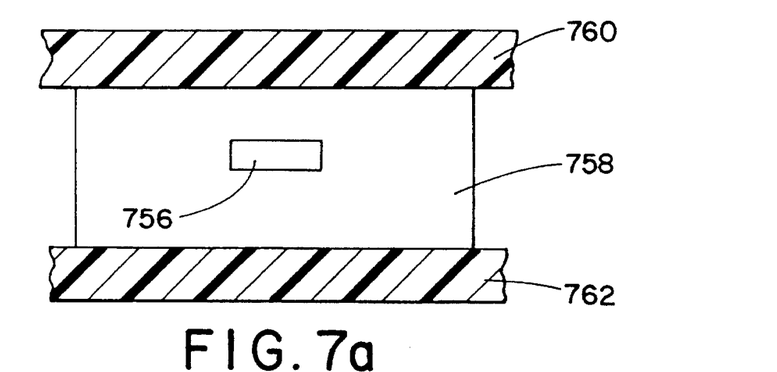
FIG. 7a is a cross sectional view of a copper electrode tip shown surrounded by epoxy sandwiched between an upper and a lower ceramic layer.
Figure 7B:
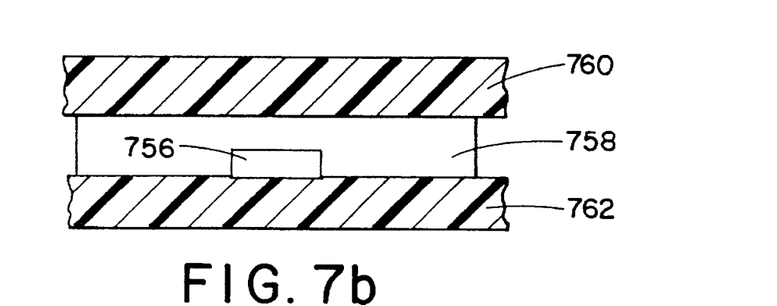
FIG. 7b is a cross sectional view of a copper electrode tip shown sandwiched between an upper and a lower ceramic layer and bonded to the lower ceramic layer; and, FIGS. 8a and 8b are top views of alternate electrode arrangements positioned adjacent an optical fiber passline.

In all of the embodiments heretofore described in accordance with this invention, it is preferable, but not essential, that the copper electrode layer be directly physically bonded to at least one layer of ceramic substrate material to enhance heat transfer. Referring now to FIG. 7a, a copper electrode tip 756 is shown surrounded by epoxy 758 sandwiched between an upper and a lower ceramic layer 760 and 762. Although this embodiment is functional, a large amount of epoxy is burned up or otherwise destroyed when the copper electrode tip reaches a high temperature limiting the heat transfer. In the preferred embodiment of FIG. 7b, the electrode tip 756 is shown physically bonded to a lower heat dissipating layer 762 of ceramic by way of being electroplated and fired for optimum adhesion.

Figure 8A:
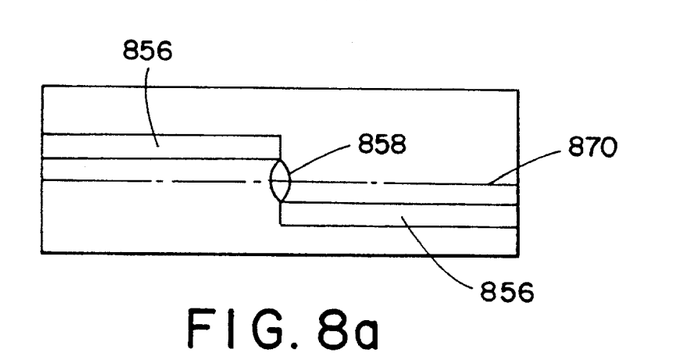
Figure 8B:
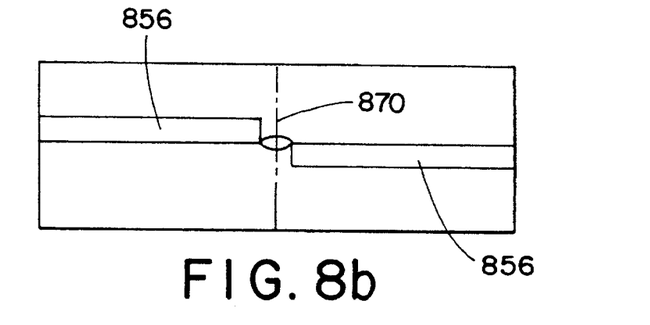

Turning now to FIGS. 8a and 8b, two alternate electrode 856 configurations are shown. In each of these figures, the corner of the electrode serves as the electrode tip. When a suitable voltage is applied, the air across the gap ionizes and an arc 858 occurs across the tips. The voltage necessary to initiate and maintain the arc depends on the gap width among other physical factors.

Of course, numerous other embodiments may be envisaged without departing from the spirit and scope of the invention. For example, any of the embodiments shown in FIGS. 4, 5, 6, and 8, could also be manufactured without a top sheet above the electrodes. As well, the blocks, shown could also be manufactured with one or more alignment grooves to accommodate a plurality of optical fibers, for example to accommodate ribbon fiber fusion applications. Although in most of the embodiments shown, the electrode cross section is rectangular, square or circular cross sections or others can also be used. The fusion blocks shown are typical block shaped elements, however, within the scope of this invention the definition of a block encompasses all forms or elements having one or more substantially planar sides.

By overlaying elongate electrode material over a non-conducting substrate, a convenient, inexpensive consumable fusion block is provided.

The invention has been described with reference to the preferred embodiments. Obviously modifications and alterations will occur to others upon the reading and understanding of this specification. It is our intention to include all such modifications and alterations insofar as they fall within the scope of the appended claims or the equivalents thereof.

Having thus described the invention, we now claim:

1. A method of fabricating a consumable fusion block for use in fusion splicing of optical fibers, comprising the steps of:

providing a block of non-conducting material that has a substantially flat surface;

overlaying a conducting layer onto the substantially flat surface, said conducting layer covering at least a part of the flat surface; and,     cutting through the conducting layer to sever it into at least two portions to provide electrodes and further cutting into the substantially flat surface to define a groove therein for receiving optical fibers to be fused.

2. The method of fabricating a fusion block according to claim 1, wherein the step of cutting into the substantially flat surface to define said groove includes cutting through the conducting layer thereby defining electrode tips at severed ends of the conducting layer on either side of the groove.

* * * * *